United States Patent Office 2,921,032
Patented Jan. 12, 1960

2,921,032
CATALYST COMPOSITION

Carl B. Linn, Riverside, Ill., assignor, by mesne assignments, to Universal Oil Products Company, Des Plaines, Ill., a corporation of Delaware No Drawing. Application April 27, 1955
Serial No. 504,375

3 Claims. (Cl. 252—433)

This invention relates to novel compositions of matter and more particularly to novel complexes of boron halide and certain metal halides.

The novel complexes of the present invention are of especial utility as components of catalyst compositions for effecting the conversion of organic compounds and particularly hydrocarbons. As will be illustrated in the examples appended to the present specifications, the complex, in conjunction with hydrogen halide, provides a catalyst composition of exceptional activity. In these reactions the complex alone does not function as a catalyst but only as a component of the catalyst composition. However, for some other reactions, the complex alone functions to catalyze the reactions and, in such cases, the complex may be used either alone or, if desired, along with hydrogen halide.

In one embodiment, the present invention relates to a novel composition of matter comprising a complex of boron halide and a halide of a metal selected from the group consisting of the elements in the left-hand columns of groups IV, V, VI and VII and of the noble metals in group VIII of the periodic table.

In a specific embodiment, the present invention relates to a composition of matter comprising a complex of boron trifluoride and chromous fluoride.

In another specific embodiment, the present invention relates to a composition of matter comprising a complex of boron trifluoride and manganous fluoride.

It will be noted that the novel composition of the present invention comprises a complex of boron halide and certain metal halides. Of the boron halides, boron trifluoride is particularly preferred, especially when utilized in conjunction with a metal fluoride. Other boron halides include boron trichloride, boron triiodide and boron tribromide.

The metal halide for use in accordance with the present invention is selected from the elements in the left-hand columns of groups IV, V, VI and VII and of the noble metals in group VIII of the periodic table. Preferred metal components include titanium, zirconium, vanadium, tantalum, chromium, molybdenum, tungsten, uranium, manganese, palladium and platinum. Other metals included within the groups hereinbefore set forth are hafnium, thorium, columbium, rhenium, ruthenium, rhodium, osmium, iridium, etc.

In general, the metal halide in the low valence state appears to be more effective and is preferred. The complex is believed to be of the formula $MX_2 \cdot BX_3$ where X is a halogen. However, it is understood that applicant does not intend to limit himself to this specific explanation and that the composition also may include complexes containing two and possibly more $BX_3$ constituents complexed with the metal halide. Also, it is possible that one $BX_3$ constituent may be composited with two or even more metal halide constituents, thus effecting the necessary association of these components in order to produce the active catalytic properties. Because of the theoretical formula hereinbefore set forth, and because of the method in which the complex is prepared, as well as the stability or boron trifluoride, etc., it is believed that the boron trifluoride constituent is present as such in the complex and does not become disassociated.

The complexes of the present invention generally are non-fuming solid materials and are stable at ordinary temperature and pressure. However, they lose boron halide when heated. Therefore, the complex should not be heated to high temperature at atmospheric pressure. However, when it is desired to heat the complex or to conduct reactions at elevated temperature, the heating and reaction should be effected under sufficient pressure to preclude a loss of boron trihalide.

The complex may be formed in any suitable manner. In one method, hydrogen halide is reacted with the metal to form the metal halide and the latter then is reacted with boron halide to form the complex. In another method, hydrogen halide and boron trihalide are contacted simultaneously with the metal. In preparing the complex, it apparently is necessary that an environment of hydrogen halide is present during the addition of the boron halide. Therefore, when the hydrogen halide is added first and then the boron halide, sufficient hydrogen halide should be present in the system in order to effect the formation of the desired complex. The metal preferably is in a finely divided state and conveniently comprises metal powder. The reaction is exothermic and, in general, will yield one mole of hydrogen for each gram atom of metal. It will be noted that the preferred reaction entails two moles of hydrogen halide and one mole each of metal and boron trihalide.

The complex as formed in the above manner may be utilized either as a liquid solution or as a solid mass. When utilized as a liquid, the complex preferably is prepared as a solution in anhydrous hydrogen halide. This embodiment is particularly desirable when the complex is utilized along with the hydrogen halide as the catalyst composition. The complex in general, is soluble in hydrogen halide only to a small extent and thus the catalyst composition will comprise an excess of hydrogen halide. It is understood that, in some cases, an excess of solid complex may be employed and the catalyst, in this embodiment, will comprise a mixture of liquid and solid phases.

When the complex is utilized as a solid mass, it may be disposed as a fixed bed in a reaction zone. When employed, hydrogen halide may be introduced into the reaction zone along with the reactants or in any other suitable manner. In still another embodiment in which the complex is utilized as a solid mass, the complex may be prepared as a composite with a suitable supporting material. The supporting material preferably is not reactive with hydrogen halide and is porous. A particularly preferred support comprises activated charcoal. Other supporting materials may comprise certain metal fluorides including, for example, aluminum fluoride, calcium fluoride, magnesium fluoride, strontium fluoride, barium fluoride, etc., as well as other solid metal halides or other metal compounds which will not be dissolved, removed or otherwise adversely affected during use as a catalyst in effecting the conversion reaction. The composite of complex and support may be prepared in any suitable manner.

As hereinbefore set forth, for effecting some reactions the complex preferably is utilized in conjunction with hydrogen halide. It is understood that, in some cases, certain halogen-containing compounds and particularly alkyl halides, including alkyl fluoride, alkyl chloride, alkyl bromide and alkyl iodide may be utilized in place of or along with the hydrogen halide. Specific alkyl halides include ethyl fluoride, propyl fluoride, butyl fluoride, amyl fluoride, hexyl fluoride, etc., ethyl chloride, propyl chloride, butyl chloride, amyl chloride, hexyl chloride, etc., ethyl iodide propyl iodide, butyl iodide, amyl iodide, hexyl iodide, etc., ethyl bromide, propyl bromide, butyl bromide, amyl bromide, hexyl bromide, etc., or mixtures thereof. It is understood that polyhalo-alkane compounds, halo-cyclic compounds and/or polyhalo-cyclic compounds may be utilized in some cases. Furthermore, it is understood that these various modifications are not necessarily equivalent and that suitable modification in operation may be necessary to accommodate these changes.

When utilized along with hydrogen halide, the proportions of hydrogen halide and complex may vary over a wide range as, for example, from 0.01:1 or less to 200:1 or more, and preferably from 0.5:1 to 150:1, molar proportions of hydrogen halide per molar proportion of complex. The specific proportions generally will depend upon the particular reaction being catalyzed and whether the complex is utilized as a solution in hydrogen halide or as a solid mass.

The catalyst composition of the present invention may be utilized for effecting various reactions of organic compounds and particularly of hydrocarbons. These reactions include (A) condensation reactions in which two molecules, which may be the same or different, are condensed to form a larger size molecule, (B) destructive reactions in which a molecule is decomposed into a smaller size molecule or into two or more molecules, (C) rearrangement reactions as, for example, isomerization, (D) disproportionation reactions in which a radical is transferred from one molecule to another molecule, (E) hydrogenation reactions, and (F) other reactions. Among these reactions are (1) polymerization of olefins and particularly of ethylene, propylene, butylene, amylene and higher boiling olefins, or mixtures thereof (2) alkylation of isoparaffins with olefins or other alkylating agents including, for example, alkyl halides, etc., and particularly the alkylation of isobutane, isopentane, and/or isohexane with ethylene, propylene, butylene, amylene, etc., or mixtures thereof, (3) alkylation of aromatics with olefins or other alkylating agents, and particularly the alkylation of benzene, toluene, etc., with propylene, butylene, amylene, and higher boiling olefins, particularly nonene, decene, undecene, dodecene, tridecene, tetradecene, pentadecene, etc., or mixtures thereof (4) isomerization of paraffins and particularly of n-butane, n-pentane, n-hexane, n-heptane, n-octane, etc., or mixtures thereof, (5) isomerization of naphthenes as, for example, the isomerization of methyl cyclopentane to cyclohexane, isomerization of dimethyl cyclopentane to methyl cyclohexane, etc., (6) alkylation of phenols or thiophenols with olefins or other alkylating agents, (7) alkylation of thiophenes with olefins or other alkylating agents, (8) hydrogen transfer reactions, (9) alkyl transfer reactions, (10) dealkylation reactions, (11) dehydrogenation of saturated hydrocarbons including paraffins, naphthenes, etc., to form unsaturated compounds including olefins, cycloolefins, etc., or the dehydrogenation of the unsaturated compounds to form more highly unsaturated compounds as diolefins, cyclodiolefins, aromatics, etc., (12) reforming of gasoline or naphtha to improve the antiknock characteristics thereof, (13) destructive hydrogenation reactions, (14) cracking of oil heavier than gasoline into lower boiling products and particularly gasoline, (15) hydrogenation reactions in which an unsaturated compound is hydrogenated to a more saturated compound as, for example, the hydrogenation of diolefins to olefins, olefins to paraffins, cycloolefins to naphthenes, etc., (16) reductive alkylation reactions as, for example, the reductive alkylation of an amino compound and particularly an aromatic amino compound, including aniline, phenylene diamine, naphthyl amine, etc., with a ketone, aldehyde, etc., in order to replace one or more of the hydrogens attached to the nitrogen atom or atoms with a hydrocarbon substituent, and (17) other reactions of hydrocarbons or other organic compounds. The operating conditions to be employed will depend upon the particular reaction and generally will be at ambient temperature, although an elevated temperature may be employed, particularly with superatmospheric pressure. In some reactions it may be preferred to utilize subatmospheric temperature. Thus, the temperature may range from $-50°$ C. or less to $300°$ C. or more, preferably $10°$ to $150°$ C., and the pressure may range from atmospheric to 5000 pounds or more, preferably atmospheric to 200 pounds. Hydrogen may be employed when required or of advantage.

The process may be effected in any suitable manner, which will depend upon the particular reaction and the form in which the catalyst is used. When the catalyst is used as a solution, a convenient method is to pass the reactant or reactants and catalyst through suitable mixing means and thereby effect intimate contact between the reactants and catalyst. In one method, this may be accomplished by utilizing a reaction zone equipped with suitable agitating means. In another method, the mixture of reactant or reactants and catalyst may be passed through orifice mixers, etc., and then through suitable time tanks to effect the desired contacting. Other well-known means may be utilized to effect the desired contacting of the reactants and catalyst.

When the complex is used as a solid mass, it may be disposed as a fixed bed in a reaction zone, and the reactants and hydrogen halide, when employed, are supplied thereto in any suitable manner. The reactants may be passed either in upward or downward flow through the catalyst bed. In one method, hydrogen halide, when employed, may be commingled with all or a portion of one of the reactants and the mixture supplied to the reaction zone. In this embodiment, a convenient method is to pass all or a portion of the reactant or, in case two reactants are employed, to pass all or a portion of one of the reactants, usually the less reactive material, continuously or intermittently through a body or pool of liquid hydrogen halide, and the reactant saturated with hydrogen halide then is introduced into the reaction zone. When desired, the hydrogen halide may be supplied separately to the reaction zone and passed concurrently or countercurrently to the reactants. In still another embodiment, the hydrogen halide may be introduced at a mid-point in the reaction zone or, when desired, the hydrogen halide may be introduced at either the upper or lower portion of the reaction zone and the reactants introduced at a mid-point in the reaction zone.

The hydrogen halide, when employed, may be introduced continuously or intermittently as desired. In some cases, the hydrogen halide may be introduced initially in the operation and the flow of hydrogen halide discontinued during part or all of the remainder of the operation. Apparently, sufficient hydrogen halide is retained in the reaction zone, possibly in a chemical or physical association with the complex, to produce the desired catalyst effect. Also, in some cases, boron halide may be introduced into the reaction zone during the conversion process, either continuously or intermittently, especially in operations where boron halide may be evolved and removed with the effluent products from the reaction zone.

Regardless of the particular operation employed, the products are fractionated or otherwise separated to recover the desired product, and to separate unconverted material for recycling. Hydrogen halide when present in the effluent product likewise is separated and preferably is recycled. Similarly, when boron halide is present in the effluent product, it may be separated and either recycled to the reaction zone or reused in preparing additional complex.

The following examples are introduced to illustrate further the novelty and utility of the present invention but not with the intention of unduly limiting the same.

Example I

A complex of chromous fluoride and boron trifluoride was prepared in the following manner. 26 grams of chromium powder and 55 grams of anhydrous hydrogen fluoride were charged into a rotating autoclave. The autoclave was heated to about 100° C. and rotated for 4 hours at this temperature, following which it was allowed to cool. 48 grams of boron trifluoride then were pressured in, followed by heating to 100° C. for 1 hour. The autoclave then was cooled, the pressure released, and 61 grams of solid product was recovered. This was a non-fuming, light green powder, which dissolved in water rather vigorously.

Example II

The above prepared complex of chromous fluoride and boron trifluoride was utilized, along with hydrogen fluoride, for the isomerization of n-butane. The charge comprised 103 grams of n-butane and the catalyst comprised 60 grams of hydrogen fluoride and 15 grams of the complex. This run was made in an anhydrous and oxygen-free system utilizing a sealed rotating autoclave and a temperature of 100° C. After 16 hours of contacting, the hydrocarbon product was separated. This product comprised 35 mole percent isobutane and 63 mole percent n-butane. The n-butane may be recycled for further isomerization and thereby increase the yield of the deired isobutane.

Example III

A complex comprising manganese fluoride, boron trifluoride was prepared by the same general method as described in Example I. In this example, 32 grams of manganese powder and 63 grams of anhydrous hydrogen fluoride were sealed into a rotating autoclave. The autoclave was heated to 100–120° C. for 6.5 hours, following which it was allowed to cool and the hydrogen released. The gas obtained was approximately theoretical for the reaction: $Mn+2HF=MnF_2+H_2$. 69 grams of boron trifluoride were pressured in, and the autoclave was then rotated at atmospheric temperature for several hours. 114 grams of complex was recovered as a white powder. The yield in this run was greater than the calculated for forming $MnF_2 \cdot BF_3$ and less than for $MnF_2 \cdot 2BF_3$; yield was close to that demanded by the formula, $MnF_2 \cdot 3/2BF_3$.

Example IV

The above prepared complex of $MnF_2$ and $BF_3$ was utilized along with hydrogen fluoride for the isomerization of n-butane. The charge comprised 109 grams of n-butane and the catalyst comprised 47 grams of hydrogen fluoride and 15 grams of the complex. This run was made in an anhydrous and oxygen-free system utilizing a sealed rotating autoclave and a temperature of 100° C. for 17 hours. The hydrocarbon product of this reaction was analyzed by mass spectroscopy and gave the following results:

| Product: | Mole percent |
|---|---|
| Propane | .3 |
| Isobutane | 37.4 |
| n-butane | 61.6 |
| $C_5+$ | .7 |

Example V

The complex prepared in accordance with Example III was utilized as a catalyst for the alkylation of m-cresol with amylene in an anhydrous and essentially oxygen-free system. The charge comprised 27.5 grams of m-cresol and 17.5 grams of amylene. The catalyst comprised 8 grams of the complex. The run was effected in a glass alkylating unit at a temperature of 25–30° C. for 2 hours using vigorous stirring. From the product 37 grams of alkylated cresol was recovered.

Example VI

The complex of this example comprises manganous chloride and boron chloride composited with activated charcoal. Charcoal particles are soaked in an aqueous solution of $MnCl_2 \cdot 4H_2O$ for 20 hours, after which excess solution is drained and the solid dried at 200° C. for 16 hours to form a composite of manganese chloride intimately dispersed throughout the charcoal. The composite of manganous chloride and charcoal then is reacted with boron chloride to form a complex of manganese chloride-boron chloride.

Example VII

A complex of vanadium iodide-boron triiodide is prepared by reacting hydrogen iodide and boron triiodide with vanadium powder at 100° C. for 24 hours in a sealed autoclave, after which the pressure is released and the complex recovered as a powder.

I claim as my invention:

1. A complex of boron halide and chromium halide, said halides having the same halogen.
2. A complex of boron trifluoride and chromous fluoride.
3. A catalyst composition comprising hydrogen fluoride and a complex of boron trifluoride and chromous fluoride.

References Cited in the file of this patent

UNITED STATES PATENTS

| 2,092,295 | Peski et al. | Sept. 7, 1937 |
| 2,142,980 | Huijser et al. | Jan. 3, 1939 |
| 2,217,019 | Ipatieff et al. | Oct. 8, 1940 |
| 2,366,736 | Linn et al. | Jan. 9, 1945 |
| 2,499,515 | Lien | Mar. 7, 1950 |